United States Patent [19]
Colchagoff

[11] 3,785,795
[45] Jan. 15, 1974

[54] APPARATUS FOR POSITIVELY CENTERING A GLASS FORMING THIMBLE

[75] Inventor: Robert D. Colchagoff, Toledo, Ohio

[73] Assignee: Owens-Illinois Inc., Toledo, Ohio

[22] Filed: July 12, 1972

[21] Appl. No.: 271,079

[52] U.S. Cl.............. 65/307, 65/323, 65/235, 65/359, 65/361
[51] Int. Cl. .............. C03b 11/00, C03b 9/40
[58] Field of Search............ 65/323, 361, 359, 65/307, 235

[56] References Cited
UNITED STATES PATENTS

| | | | |
|---|---|---|---|
| 1,693,069 | 11/1928 | Cramer | 65/235 X |
| 3,580,712 | 5/1971 | Mumford | 65/323 X |
| 2,031,739 | 2/1936 | Shaffer | 65/323 |
| 3,708,274 | 1/1973 | Fleck | 65/323 X |
| 2,006,056 | 6/1935 | McNamara | 65/323 X |
| 877,981 | 2/1908 | Beesort | 65/307 |

Primary Examiner—Frank W. Miga
Attorney—Steve M. McLary et al.

[57] ABSTRACT

Apparatus for positively centering a glass forming thimble. The thimble in a glass forming operation is used to form the extreme upper portion of the finish of a glass container. In this invention, the thimble is connected to the two neck ring halves within which it is positioned. This assures that the thimble will always be positively centered with respect to the neck ring halves when they are opened.

10 Claims, 2 Drawing Figures

APPARATUS FOR POSITIVELY CENTERING A GLASS FORMING THIMBLE

BACKGROUND OF THE INVENTION

This invention generally relates to apparatus for making glass containers. More particularly, this invention relates to making glass containers using an "IS" type machine. Specially, this invention relates to a positive centering apparatus for a thimble used in such a glass container manufacturing process.

The majority of glass containers made today are manufactured on the well known "IS" machine. In this process, the finish or upper portion of the container is formed in a pair of separable neck ring halves. A thimble is inserted between the neck ring halves and travels with them, the purpose of the thimble being to form the extreme uppermost portion of the finish. When the neck ring halves open to release a partially formed container, the thimble should remain centered relative to the opened halves. However, the thimble often sticks, and goes with one half or the other. This causes the container to be deflected to one side or the other, resulting in poor loading of the partially finished container in the final blow mold. U.S. Pat. No. 3,149,951 shows one method of retaining a thimble in a central location. However, this patent was concerned with a glass forming machine other than the "IS" machine. The teachings therein could not be readily adapted to an "IS" machine; in addition, the teachings of the patent were directed toward a cumbersome cam arrangement external of the neck ring-thimble combination. I have devised a simple centering system which is completely self-contained within the neck ring-thimble unit.

SUMMARY OF THE INVENTION

My invention is an improvement in an apparatus for forming glass containers wherein a portion of the finish of the glass container is formed by a thimble carried by and located intermediate of two transversely separable neck ring halves, the improvement comprising a means connecting the thimble to the neck ring halves for substantially positively centering the thimble with respect to the neck ring halves when the neck ring halves are separated.

DETAILED DESCRIPTION OF THE DRAWINGS

Those skilled in the glass making art will readily recognize the present invention and know the environment in which it operates. If clarification should be needed, U.S. Pat. No. 2,508,890 to G.E. Rowe, the teachings of which are herein incorporated by reference, clearly teaches the general function and operational environment of an apparatus similar to that of the present invention.

Figure 1:
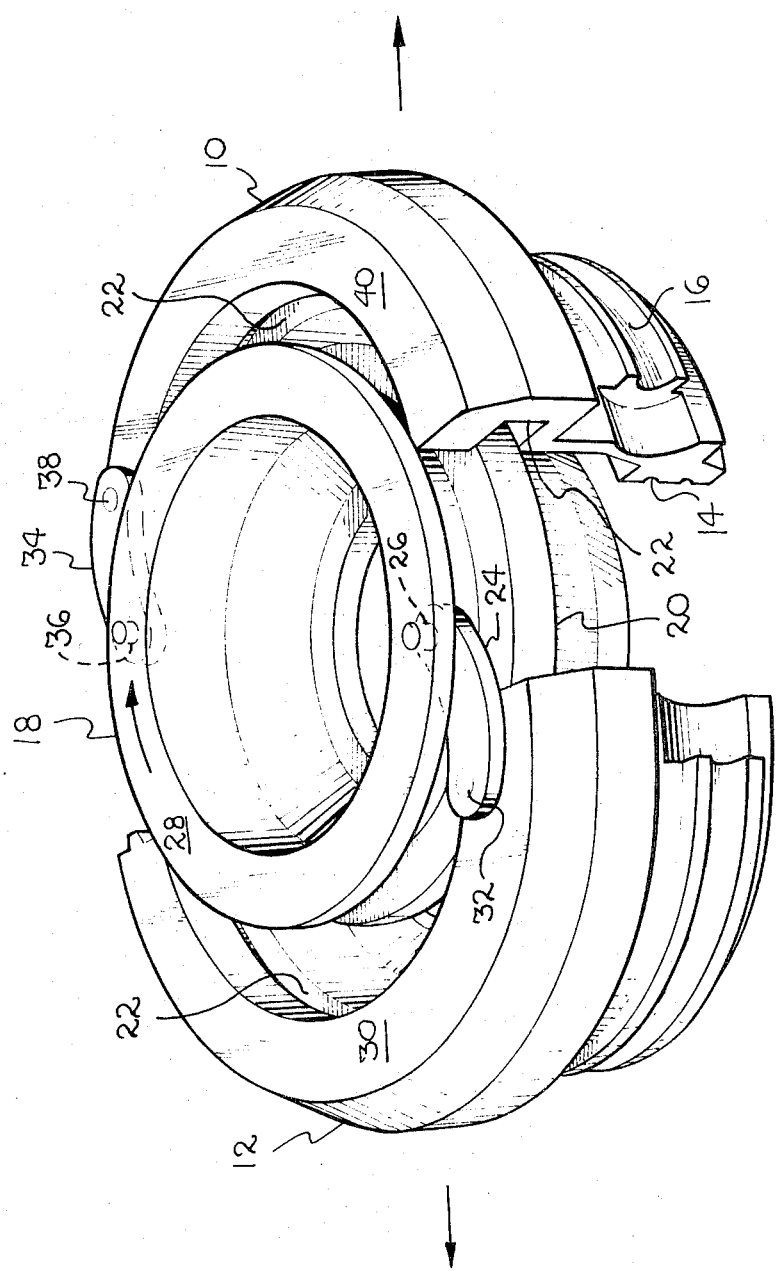
FIG. 1 is a perspective view of one embodiment of the apparatus of the present invention, removed from its operational environment.

In FIG. 1, a pair of complimentary neck ring halves 10 and 12 are shown. The neck ring halves 10 and 12 are used to form the "finish" or upper portion of a glass container made on the well known "IS" glass forming machine, the functioning of which may be seen in the Rowe patent. The finish in the example illustrated is formed in a threaded portion 14. The neck ring halves 10 and 12 are mounted in a neck ring holder by use of an annular groove 16 in the lower portion of the neck ring halves 10 and 12. As those skilled in the art will recognize, the neck ring halves 10 and 12 are shown in the open position as they would be to deliver a bottle blank or parison to a finishing mold. The finish portion of a bottle is formed with the neck ring halves 10 and 12 in a closed position, and they must open to release the bottle. An annular thimble 18 is carried by the neck ring halves 10 and 12. It is the function of the thimble 18 to form the extreme upper lip of the bottle finish, in the illustrated example, the portion immediately above the threads 14. This function is necessary to allow formation of the extreme upper portion of the finish without a seam for sealing purposes when the bottle is filled. A seam in this area could lead to a defective seal. The thimble is constrained to travel with the neck ring halves 10 and 12 by means of a complimentary tongue 20, formed on the thimble 18, and groove 22 formed in the interior of the neck ring halves 10 and 12. The maximum degree of opening of the neck ring halves 10 and 12 is controlled such that the tongue 20 cannot slip completely out of the groove 22.

When the neck ring halves 10 and 12 open to release a bottle, the thimble 18 should remain centered. However, since the thimble 18 "floats" freely in the groove 22, it may go with one or the other of the neck ring halves 10 or 12. This will cause the bottle to be deflected to one side or the other, thus creating an improper delivery situation and a possibly defective bottle.

I have provided a parallel linkage system for ensuring that the thimble 18 is always centered when the neck ring halves 10 and 12 are opened. A link 24 is attached through a pivot pin 26 to the underside of a flange portion 28 of the thimble 18. The other end of the link 24 is attached to the top of a rim portion 30 of the neck ring half 12 through a pivot pin 32. A second link 34 is attached to the flange portion 28 through a pivot pin 36 at substantially a diametrically opposed location from the first link 24. A pivot pin 38 connects the second link 34 to the top of a rim portion 40 of the neck ring half 10. The net result of this linkage is that as the neck ring halves 10 and 12 are moved in the direction shown by the arrows adjacent to them for opening, the pivot pins 26, 32, 36 and 38 and the links 24 and 34 will allow the thimble 18 to rotate in the direction shown by the arrow on the flange portion 28. This guarantees that the thimble 18 will always be centered with respect to the neck ring halves 10 and 12 for proper delivery of a bottle. In closing the neck ring halves 10 and 12, the thimble 18, of course, rotates in the opposite direction and is held in place by full engagement of the tongue 20 and groove 22. The flange portion 28 is vertically spaced from the rim portions 30 and 40, and partially overlies the rim portions 30 and 40 when the neck ring halves 10 and 12 are closed. The opening direction is the transverse axis of the neck ring and thimble set defined by the thimble 18, the neck ring halves 10 and 12, and a means for centering the thimble 18 with respect to the neck rings 10 and 12 when the neck rings 10 and 12 are opened. In this case, the centering means is the two links 24 and 34 and the pivot pins 26, 32, 36 and 38.

Figure 2:
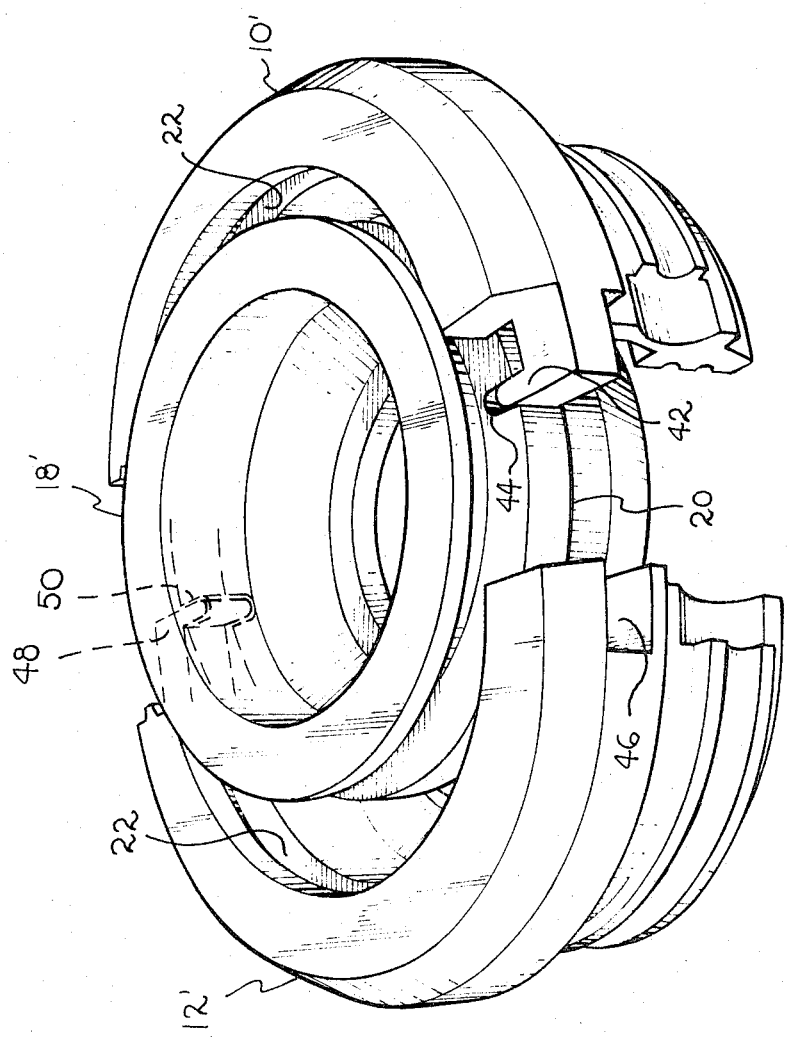
FIG. 2 is a perspective view of another embodiment of the apparatus of the present invention, removed from its operational environment.

FIG. 2 illustrates a second embodiment of the present invention. It should be clear that both FIG. 1 and FIG. 2 illustrate a means for positively centering a thimble with respect to two movable neck ring segments. In FIG. 2, two modified neck ring halves 10' and 12' are shown. The neck ring half 10' has a substantially "L" shaped retaining lug 42 integrally attached at one edge of the neck ring half 10' which mates with the neck ring half 12'. The foot of the "L" shaped lug 42 extends inwardly toward the center of the neck ring half 10' and is slideably engaged in a slot 44 formed in the tongue 20 of a modified thimble 18'. In the closed position, the lug 42 is bottomed in the slot 44, and the tongue 20 is engaged with the groove 22 as is normally the case. Upon opening, however, the lug 42 is partially retracted from the slot 44, again allowing the thimble 18' to rotate with respect to the neck ring halves 10' and 12'. A recess 46 is provided in the mating face of the neck ring half 12' to receive the lug 42 in the closed position. A corresponding lug 48 (shown in dotted lines) is provided on the neck ring half 12', diametrically opposed from the lug 42 to ensure proper centering of the thimble 18'. The lug 48 is engaged with a slot 50 in the tongue 20, and fits into a recess (not shown) similar to the recess 46 when the neck ring halves 10' and 12' are closed.

While the foregoing invention has been disclosed specifically with respect to "IS" machine operations, it should be apparent to one skilled in the art that the principles set forth in the foregoing are applicable to glass forming machines of other types which use the combination of separable neck ring halves and a thimble.

What I claim is:

1. In an apparatus for forming glass containers, wherein a portion of the finish of said glass container is formed by a thimble carried by and located intermediate of two transversely separable neck ring halves, the improvement which comprises: means interposed said thimble and said neck ring halves and connecting said thimble and said neck ring halves for substantially, positively centering said thimble with respect to said neck ring halves when said neck ring halves are separated.

2. The apparatus of claim 1, wherein said means for substantially, positively centering said thimble comprises: two substantially diametrically opposed links located adjacent one end of said neck rings and thimble combination; and means for pivotally connecting one end of each of said links to said thimble and the opposite end of each of said links to said neck ring halves.

3. The apparatus of claim 1, wherein said means for substantially, positively centering said thimble comprises: interconnecting lug and slot means formed on said thimble and neck ring halves to tie said thimble together with said neck rings as a unit.

4. The apparatus of claim 3, wherein said thimble is formed with two substantially diametrically opposed slots and wherein two lugs are positioned on substantially diametrically opposed faces of said neck ring halves, one lug being located on each of said neck ring halves, in sliding engagement with said slots.

5. In an apparatus for forming glass containers, wherein a portion of the finish of said glass container is formed by a thimble carried by and located intermediate of two transversely separable neck ring halves, said thimble including an annular main body portion having a central bore therein and an annular flange portion located adjacent one end of said bore, said flange portion having a diameter greater than the diameter of said main body portion, and wherein each of said neck ring halves includes a rim portion adjacent to and longitudinally spaced from said flange portion, the improvement which comprises: means connecting said thimble to said neck ring halves for substantially, positively centering said thimble with respect to said neck ring halves when said neck ring halves are separated.

6. The apparatus of claim 5, wherein said means for substantially, positively centering said thimble comprises, in combination: two substantially diametrically opposed links, positioned at least partially under said flange portion, and means for pivotally connecting one end of each of said links to said flange portion and the opposite end of each of said links to said rim portion.

7. The apparatus of claim 5, wherein said thimble is formed with two substantially diametrically opposed slots therein and wherein said means for substantially, positively centering said thimble comprises, in combination: two substantially "L" shaped lugs located on diametrically opposed faces of said neck ring halves, one lug being located on each of said neck ring halves, said lugs having a foot portion thereof in sliding engagement with said slots formed in said thimble, and recess means formed in the face of the opposing neck ring half facing said lug for receiving said lug when said neck ring halves are closed.

8. An article of manufacture comprising a neck ring and thimble set for use in glass forming, said thimble comprising an annular main body portion having a central bore therein, an annular flange portion located adjacent one end of said bore, said flange portion having a diameter greater than the diameter of said main body portion, and a tongue portion positioned intermediate the height of said main body portion and extending substantially around the entire circumference of said main body portion at a diameter greater than the diameter of said main body portion; said neck ring comprising a pair of substantially semicircular neck ring halves, engageable to form an annular neck ring, said neck ring halves having a circumferential groove formed in the interior thereof for receiving said tongue to hold said thimble in a position intermediate said neck ring halves, said neck ring halves having a bottle finish defining portion formed on the interior thereof; and means connecting said thimble to said neck ring halves for substantially, positively centering said thimble with respect to said neck ring halves when said neck ring halves are separated, to thereby define a neck ring and thimble set.

9. The article of claim 8, wherein said means for substantially, positively centering said thimble comprises: two substantially diametrically opposed links, positioned at least partially under said flange portion, and means for pivotally connecting one end of each of said links to said flange portion and the opposite end of each of said links to said rim portion.

10. The article of claim 8, wherein said thimble is formed with two substantially diametrically opposed slots in the tongue portion, and wherein said means for substantially, positively centering said thimble comprises: two substantially "L" shaped lugs located on diametrically opposed faces of said neck ring halves, one lug being located on each of said neck ring halves, said lugs having a foot portion thereof in sliding engagement in said slots formed in said thimble, and recess means formed in the face of the opposing neck ring half facing said lug for receiving said lug when said neck ring halves are closed.

* * * * *